US009015268B2

(12) United States Patent
Swanson et al.

(10) Patent No.: US 9,015,268 B2
(45) Date of Patent: Apr. 21, 2015

(54) REMOTE DIRECT STORAGE ACCESS (75) Inventors: Robert C. Swanson, Olympia, WA (US); Vincent J. Zimmer, Federal Way, WA (US); Mallik Bulusu, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 320 days.

(21) Appl. No.: 12/753,294

(22) Filed: Apr. 2, 2010

(65) Prior Publication Data
US 2011/0246597 A1    Oct. 6, 2011

(51) Int. Cl.
G06F 15/167 (2006.01)
G06F 3/06 (2006.01)
G06F 21/78 (2013.01)
H04L 29/08 (2006.01)

(52) U.S. Cl.
CPC ............ *G06F 3/0658* (2013.01); *G06F 3/0605* (2013.01); *G06F 3/067* (2013.01); *G06F 3/0679* (2013.01); *G06F 21/78* (2013.01); *H04L 67/1097* (2013.01)

(58) Field of Classification Search
USPC ................................. 709/212, 213
See application file for complete search history.

(56) References Cited

U.S. PATENT DOCUMENTS

| 5,974,496 | A * | 10/1999 | Miller ........................ 710/315 |
| 7,024,551 | B2 * | 4/2006 | King et al. ........................ 713/2 |
| 7,082,527 | B2 | 7/2006 | Zimmer et al. |
| 7,174,451 | B2 | 2/2007 | Zimmer et al. |
| 7,237,036 | B2 | 6/2007 | Boucher et al. |
| 7,275,152 | B2 | 9/2007 | Goud et al. |
| 7,310,742 | B2 | 12/2007 | Zimmer et al. |
| 7,350,072 | B2 | 3/2008 | Zimmer et al. |
| 7,506,149 | B2 | 3/2009 | Rothman et al. |
| 7,543,048 | B2 | 6/2009 | Rothman et al. |
| 7,562,230 | B2 | 7/2009 | Komarla et al. |
| 7,617,400 | B2 | 11/2009 | Zimmer et al. |
| 7,634,629 | B2 | 12/2009 | Nemiroff et al. |
| 7,647,474 | B2 | 1/2010 | Bulusu et al. |
| 7,660,913 | B2 | 2/2010 | Zimmer et al. |

(Continued)

FOREIGN PATENT DOCUMENTS

| JP | 11149455 A | 6/1999 |
| JP | 2005-276033 A | 10/2005 |
| WO | WO2008/070173 A1 | 6/2008 |

OTHER PUBLICATIONS

Zimmer et al, U.S. Appl. No. 12/347,840, filed Dec. 31, 2008.

(Continued)

*Primary Examiner* — Dustin Nguyen
*Assistant Examiner* — Joel Mesa
(74) *Attorney, Agent, or Firm* — Schwabe, Williamson & Wyatt, P.C.

(57) ABSTRACT

Embodiments of the present disclosure include systems, apparatuses, and methods that relate to remote, direct access of solid-state storage. In some embodiments, a network interface component (NIC) of a server may access a solid-state storage module of the server by a network storage access link that bypasses a central processing unit (CPU) and main memory of the server. Other embodiments may be described and claimed.

19 Claims, 5 Drawing Sheets

(56) References Cited

U.S. PATENT DOCUMENTS

| | | | |
|---|---|---|---|
| 7,668,945 | B2 | 2/2010 | Doran et al. |
| 7,945,752 | B1* | 5/2011 | Miller et al. ............ 711/162 |
| 2004/0148329 | A1* | 7/2004 | Ogasawara et al. ......... 709/200 |
| 2004/0255106 | A1 | 12/2004 | Rothman et al. |
| 2005/0240669 | A1 | 10/2005 | Khanna et al. |
| 2005/0289218 | A1 | 12/2005 | Rothman et al. |
| 2006/0230165 | A1 | 10/2006 | Zimmer et al. |
| 2007/0067497 | A1 | 3/2007 | Craft et al. |
| 2007/0073800 | A1 | 3/2007 | Rothman et al. |
| 2007/0162641 | A1 | 7/2007 | Oztaskin et al. |
| 2007/0162955 | A1 | 7/2007 | Zimmer et al. |
| 2007/0300051 | A1 | 12/2007 | Rothman et al. |
| 2008/0049660 | A1* | 2/2008 | Kwan et al. ............. 370/318 |
| 2009/0070574 | A1 | 3/2009 | Rothman et al. |
| 2010/0095163 | A1* | 4/2010 | Ishihara et al. ............ 714/47 |
| 2010/0205351 | A1* | 8/2010 | Wiener et al. ............ 711/103 |

OTHER PUBLICATIONS

Cully et al, "An RDMA Protocol Specification (Version 1.0)," Oct. 2002, Adaptec Inc., Broadcom Corporation, Cisco Systems Inc., EMC Corporation, Hewlett-Packard Company, International Business Machines Corporation, Intel Corporation, Microsoft Corporation, Network Appliance Inc., pp. 1-60.

Office Action mailed Sep. 4, 2012 for Japanese Application No. 2011-081749, 3 pages.

European Search Report mailed Nov. 29, 2012 for European Application No. 11250412.1, 7 pages.

Office Action mailed Dec. 19, 2013 for European Application No. 11 250 412.1, 6 pages.

Office Action mailed Jan. 3, 2014 for Chinese Application No. 201110120401.7, 7 pages.

Summons to Attend Oral Proceedings mailed Sep. 16, 2014 for European Patent Application No. 11250412.1, 7 pages.

* cited by examiner

REMOTE DIRECT STORAGE ACCESS

FIELD

Embodiments of the present invention relate to the field of storage and, more particularly, remote direct storage access.

BACKGROUND

A solid-state drive (SSD) uses block-oriented storage concepts to abstract an underlying flash device, for example, a NAND semiconductor device. An operating system (OS) issues storage commands with block-level addresses to a storage controller. The storage controller then translates the block-level addresses according to a wear-leveling algorithm and issues a storage access command with respect to the translated addresses. In this manner, the storage controller can distribute read/write accesses across the flash device transparently to the OS. Issuance of block-level commands to the storage controller, however, requires that the local system state be known. This may comprise network accessibility of the flash device.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the present invention, the phrase "A and/or B" means "(A), (B), or (A and B)." For the purposes of the present invention, the phrase "A, B, and/or C" means "(A), (B), (C), (A and B), (A and C), (B and C), or (A, B and C)."

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present disclosure include systems and methods related to remote, direct access of solid-state storage. In some embodiments, a network interface component (NIC) of a server may access a solid-state storage module of the server by a network storage access (NSA) link that bypasses a central processing unit (CPU) and a main memory of the server. The NSA link may support remote direct memory access (RDMA) to provide a remote entity a linear 'memory-view' of the solid-state storage, as opposed to a block-oriented view of the local host accesses. In some embodiments, the NSA link may include an arbiter that is coupled directly with the NIC and a storage controller. In various embodiments, the NSA link may be used in network provisioning and/or repurposing of servers within a cloud server pool. In some embodiments, the NSA link may be used in fault detection and/or reporting operations. The NSA link may effect encryption and/or compression to secure communications and/or save network bandwidth.

Figure 1:
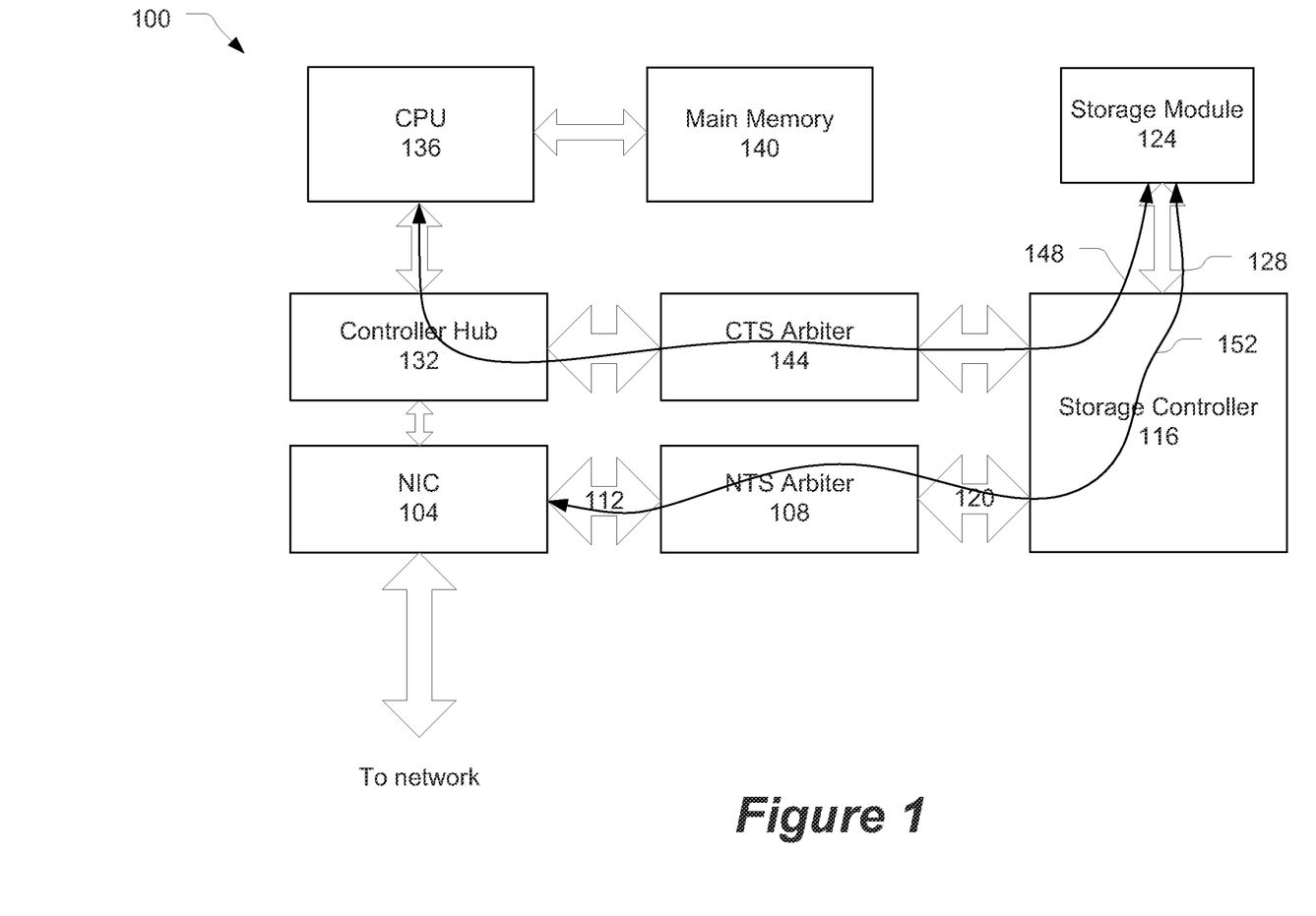
FIG. 1 illustrates a server in accordance with various embodiments.

FIG. 1 illustrates a server 100 in accordance with various embodiments. The server 100 may include a NIC 104 that is configured to communicatively couple the server 100 to a network. The NIC 104 may be directly coupled with a NIC-to-storage controller (NTS) arbiter 108 by an interconnect 112. As used herein, two components are considered "directly coupled" to one another if a signal transmitted from the first component is provided directly to a second component without any intermediate processing or routing of the signal. Components may be directly coupled with one another by an interconnect, for example, interconnect 112, such as, but not limited to, traces, wires, vias, etc.

The NTS arbiter 108 may also be directly coupled with a storage controller 116 by an interconnect 120. In alternative embodiments, the NTS arbiter 108 may be integrated into the NIC 104 and directly coupled with the storage controller 116 or integrated into the storage controller 116 and directly coupled with the NIC 104.

The storage controller 116 may be coupled to a storage module 124 by an interconnect 128. The storage module 124 may be a non-volatile storage device such as a NAND flash device or a phase-change storage device.

The server 100 may also include a controller hub 132, which may be an integrated circuit configured to control input/output (I/O) tasks with respect to various peripherals of the server 100. The controller hub 132 may be a platform controller hub (PCH), a southbridge, an I/O controller hub, etc. The controller hub 132 may be coupled, directly or indirectly, with a central processing unit (CPU) 136 of the server 100. The CPU 136 may be coupled, directly or indirectly, with main memory 140. In an embodiment in which the controller hub 132 is a southbridge, the controller hub 132 may be coupled indirectly with the CPU 136 through a northbridge. In this embodiment, the CPU 136 may be coupled to the main memory 140 through the northbridge.

The server 100 may include a controller hub-to-storage controller (CTS) arbiter 144 that is coupled with and between the controller hub 132 and the storage controller 116. In some embodiments, the CTS arbiter 144 may be integrated into the storage controller 116 or the controller hub 132. The CPU 136 may access the storage module 124 through a host storage access (HSA) link 148 that traverses the controller hub 132, the CTS arbiter 144, and the storage controller 116. Access to the storage module 124 through the HSA link 148 may appear as conventional storage access. For example, the controller hub 132 may issue an access request to the CTS arbiter 144 with a block-level address, which may be referred to as a block-level access request. The CTS arbiter 144 may translate the block-level address to a physical address in an effort to provide wear-leveling and/or error correction. The CTS arbiter 144 may issue the access request with the appropriate physical address to the storage controller 116, which may access the designated space in the storage module 124.

While access to the storage module 124 through the HSA link 148 may appear as conventional storage access, access to the storage module 124 through a network storage access (NSA) link 152, which bypasses the CPU 136 and the main memory 140, may appear as a memory access to a remote entity. This may be done by the NTS arbiter 108 posting buffers that the remote entity may reference when accessing data that is being transmitted to or from the storage module 124.

In some embodiments, the NIC 104, NTS arbiter 108, CTS arbiter 144, and/or the storage controller 116 may be integrated into the controller hub 132.

Figure 2:
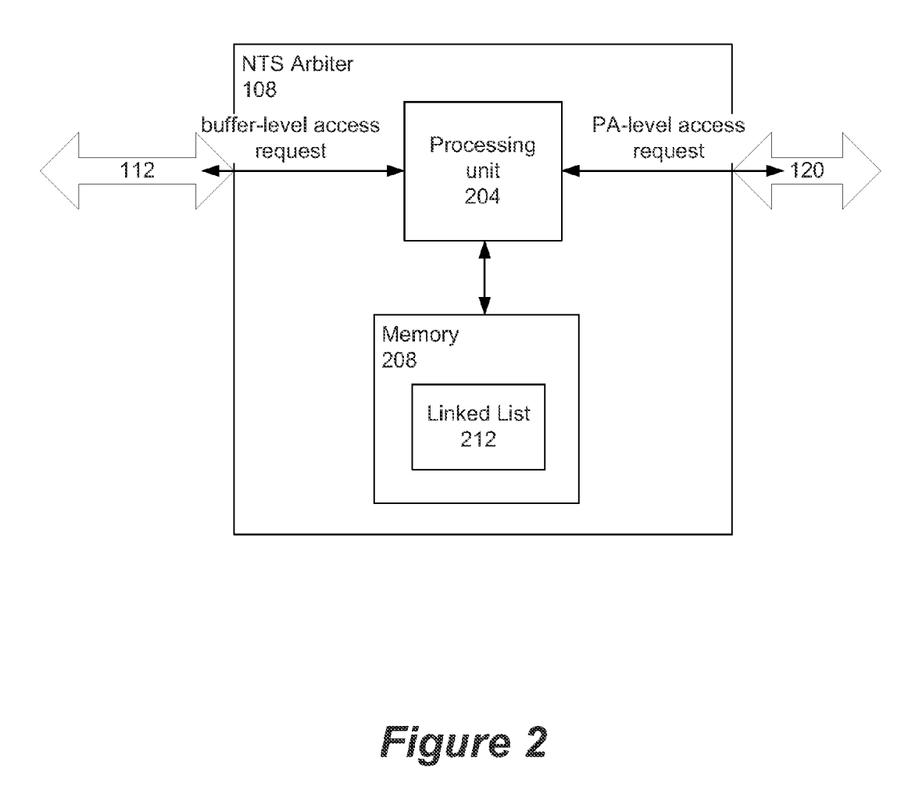
FIG. 2 illustrates an arbiter that may be used in the server of FIG. 1 in accordance with various embodiments.

FIG. 2 illustrates the NTS arbiter 108 with additional detail in accordance with some embodiments. The NTS arbiter 108 may include a processing unit 204 that is coupled to memory 208. The NTS arbiter 108 may be an integrated circuit with the memory 208 being cache memory. The processing unit 204 and memory 208 may be separate and distinct from the CPU 136 and the main memory 140. Furthermore, the processing unit 204 and memory 208 may only need limited functionality to perform the tasks associated with the NSA link 152; therefore, these components may be significantly smaller/less powerful than the corresponding CPU 136 and the main memory 140.

In operation, the processing unit 204 may communicate access requests with a remote entity, through the NIC 104, as buffer-level access requests and may communicate access requests with the storage controller 116 as physical address (PA)-based access requests. For example, the processing unit 204 may receive an access request (for example, read or a write request), from the NIC 104, identifying a buffer. The processing unit may determine an address of a physical storage space that corresponds to the buffer based on a linked list 212 in the memory 208. Having translated the buffer to the address of the physical storage space, the processing unit 204 may issue another access request, including the address of the physical storage space, to the storage controller 116.

The server 100 providing remote direct storage access as described may provide a number of advantages with respect to remote management of the server 100.

Figure 3:
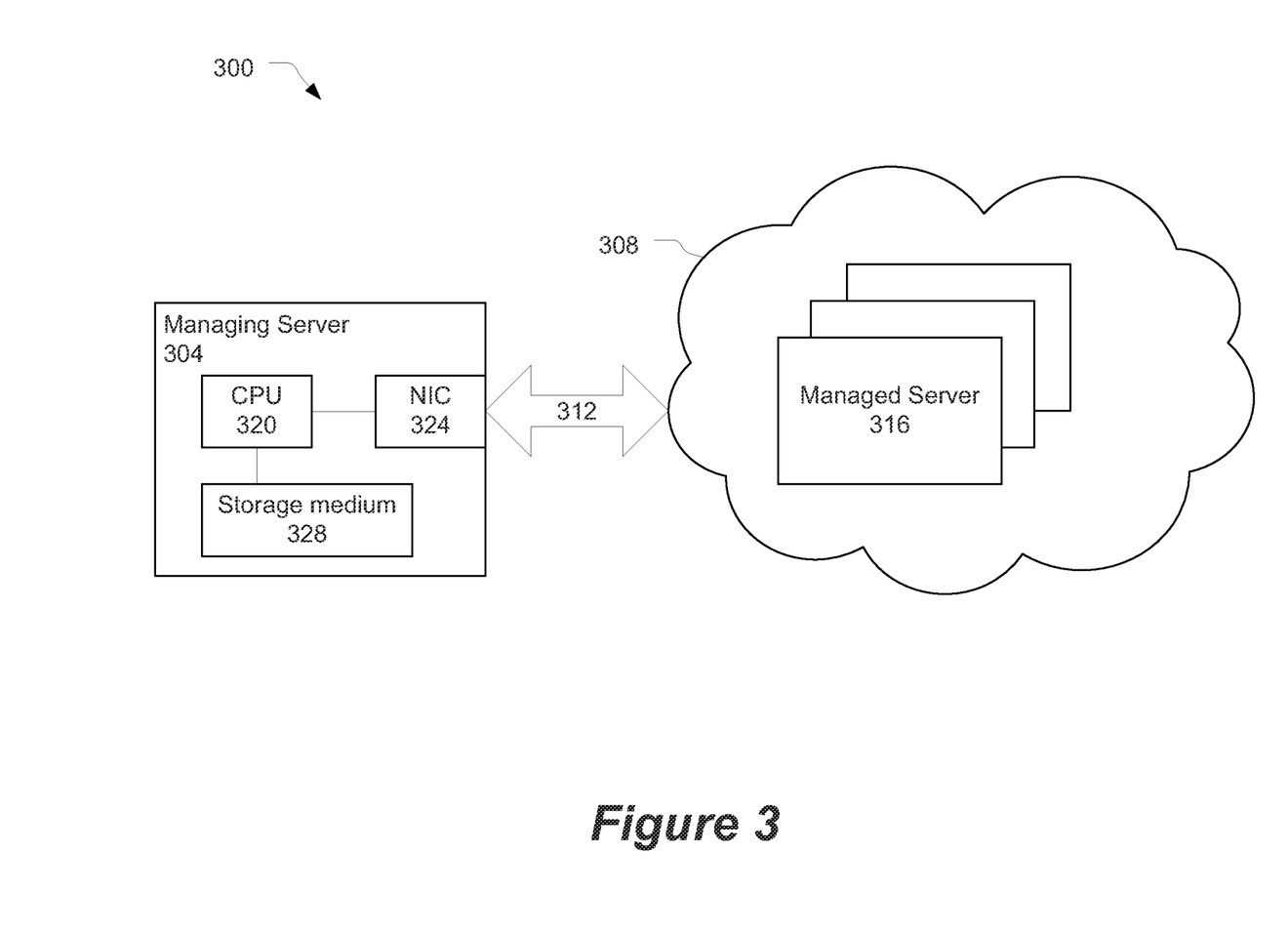
FIG. 3 illustrates a datacenter including a managing server and a cloud server pool in accordance with various embodiments.

FIG. 3 illustrates a datacenter 300 including a managing server 304 communicatively coupled with a cloud server pool 308 through a network 312 in accordance with some embodiments. The cloud server pool 308 may have one or more managed servers, for example, managed server 316. The managing server 304 may use remote direct storage access to perform any number of management tasks with respect to the managed servers of the cloud server pool 308. These management tasks include, but are not limited to, provisioning new servers, repurposing existing servers, fault management, recovery operations, etc.

The managing server 304 may include a CPU 320 coupled, directly or indirectly, with a NIC 324 and a storage medium 328. The storage medium 328 may include instructions stored thereon, which, when executed by the CPU 320 cause the managing server 304 to perform the various managing tasks described herein. The instructions may be executed directly from the storage medium 328 or moved into another medium, for example, a volatile memory, prior to execution by the CPU 320.

The managed server 316, which may be similar to server 100, may have an NSA link to a solid-state storage module, as described above, to facilitate at least some of the management tasks. Other managed servers of the cloud server pool 308 may also be similar to server 100. In some embodiments, however, one or more of the other managed servers may not have an NSA link.

Figure 4:
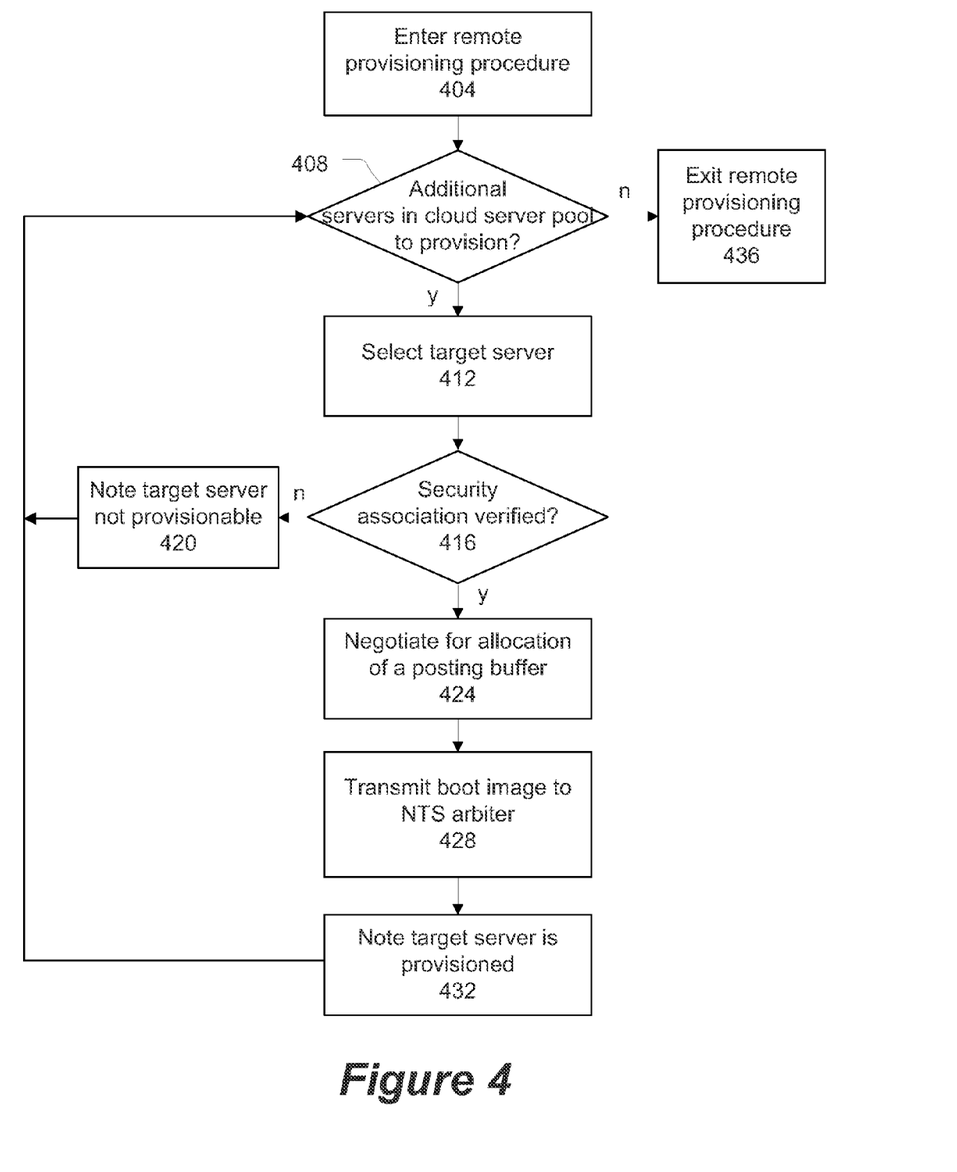
FIG. 4 is a flowchart of a method of a managing server remotely provisioning a cloud server pool in accordance with various embodiments.

FIG. 4 is a flowchart 400 of a method of a managing server, for example, managing server 304, remotely provisioning a cloud server pool, for example, cloud server pool 308, in accordance with some embodiments.

At block 404, the managing server may enter a remote provisioning procedure. This may occur when a new group of servers are added to a datacenter (or when an existing group of servers are being repurposed) and it is desired to provide the servers with appropriate boot images. The boot images may include instructions and data that allow hardware on the servers to boot. The boot image may include, for example, an operating system, utilities and diagnostics, boot and data recovery information, etc. In these embodiments, the managing server may also be referred to as a boot server.

At block 408, the managing server may determine whether there are additional servers in the cloud server pool to provision. The boot server may determine this by comparing a manifest, input to the boot server, of servers to be provisioned with an internally-generated list of previously-provisioned servers.

If, at block 408, it is determined there are additional servers to be provisioned, then the boot server may select a target server from the additional servers to be provisioned at block 412.

At block 416, which may follow block 412, the boot server may determine whether a security association of the selected target server is verified. If the target server previously had a secure association with the boot server, the boot server may determine whether the previous secure association is still valid. If the target server did not previously have a secure association with the boot server, for example, it is a new server, then the boot server may retrieve credentials from the target server, for example, a media access control (MAC) address, and compare the retrieved credentials to credentials input from the manifest of servers to be provisioned.

If, at block 416, the boot server determines that the security association is not verified, then, at block 420, the boot server may note that the target server is not provisionable and the procedure may loop back to block 408.

If, at block 416, the boot server determines that the security association is verified, then, at block 424, the boot server may negotiate, with an NTS arbiter of the managed server, for allocation of a posting buffer. As the negotiation will occur directly with the NTS arbiter of the managed server, it will not involve any action from a CPU or main memory of the managed server. The negotiation may include the boot server transmitting an allocation request to the NTS arbiter for a storage space of a given size. The boot server may then receive a response from the NTS arbiter, based on the allocation request, indicating allocation of the posting buffer and a posting buffer identifier. The response may also include a size of the posting buffer.

At block 428, which may follow block 424, the boot server may transmit a boot image and posting buffer identifier to the NTS arbiter. The NTS arbiter may cause the boot image to be stored in a physical space of the storage module that corresponds to the posting buffer. As described above, the boot image may be saved in the storage module through an NSA link of the managed server. Once the boot image is saved in the solid-state storage module, the CPU may have access to the boot image, which may be used by the CPU in a subsequent boot procedure.

After transmitting the boot image at block 428, the boot server may update its list of provisioned servers to note that the target server is provisioned at block 432. The provisioning procedure may then loop back to block 408 where the boot server may determine whether there are additional servers in the cloud server pool to be provisioned. If, at block 408, it is determined that there are no further servers to be provisioned, the boot server may exit the provisioning procedure at block 436.

While the method of remotely provisioning a managed server discussed in FIG. 4 contemplates an initial provisioning of an entire boot image, other embodiments may employ the remote direct storage access in different usage models. For example, in one embodiment a managing server may use remote direct storage access in a staged provisioning in which one or more update capsules are proactively pushed to the managed server. In some embodiments, the managed server may have the option to schedule the updates.

The remote provisioning procedure described with respect to FIG. 4 is an embodiment in which the remote direct storage access is used to transfer data to the solid-state storage module of the managed device. In other embodiments, the remote direct storage access may be used to transfer data from the solid-state storage module, for example, in a recovery operation. Such an embodiment will now be described with respect to FIG. 5.

Figure 5:
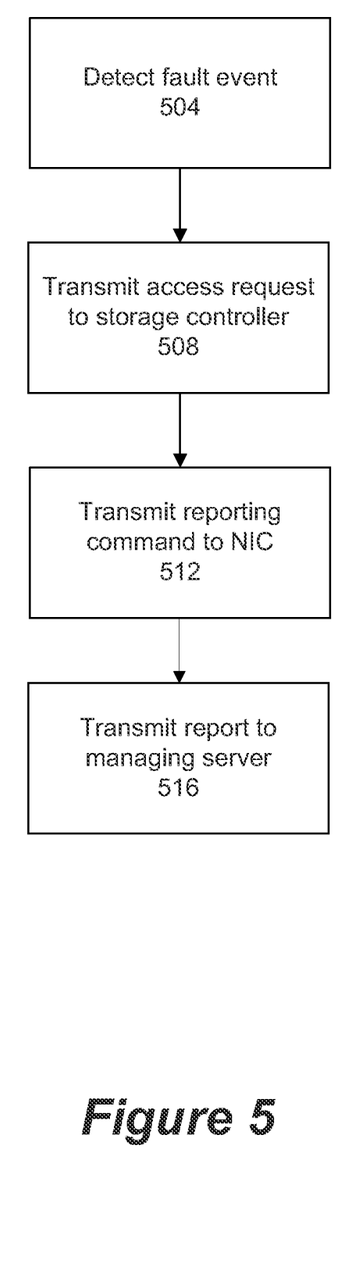
FIG. 5 is a flowchart of a method of a managed server providing a managing server with a fault report in accordance with various embodiments.

FIG. 5 is a flowchart 500 of a method of a managed server, for example, managed server 316, providing a managing server, for example, managing server 304 with a fault report in a recovery operation in accordance with some embodiments.

At block 504, an NTS arbiter, for example, NTS arbiter 108, may detect a fault event. The fault event may be with respect to a CPU and/or main memory of the managed server. In some embodiments, the NTS arbiter may detect the fault by receiving a fault report from the managing server, which may be generated and sent by the managing server when it detects an operational failure of the managed server. The managing server may detect an operational failure of the managed server when the managed server becomes non-responsive and/or fails to provide an expected action/report. In other embodiments, the NTS arbiter may detect a fault event internally, i.e., without a report from the managing server. The NTS arbiter may detect a fault event internally by monitoring a fault flag in the storage module. If a failure occurs, the fault flag may be set, for example, by a CPU of the managed server. The NTS arbiter may determine that the fault flag is set, thereby detecting the fault event.

In some embodiments, the fault flag may be set by a controlling device, for example, CPU 136 and/or storage controller 116, based on performance of a storage module, for example, storage module 124. In operation, the controlling device may track operational parameters of the storage module. The operational parameters may include read/write failures, portion of the storage module that has failed cells, available storage, response time, etc. If these operational parameters fall below a desired threshold, the controlling device may set the fault flag to be discernable by the NTS arbiter 108.

At block 508, which may occur after block 504, the NTS arbiter may transmit an access request to a storage controller of the managed server. The access request may be a read request that corresponds to a storage space in which the boot image resides and/or an execution state storage space that is dedicated to storing execution state data, for example, memory file image, crash dump log, stack state data and/or processor state data, such as register values. The CPU of the managed server may, through the HSA link, store execution state data in the execution state storage space in the course of normal operations, for example, to facilitate exit/entry into various processes, and/or in the case of detected abnormalities that may precede or follow a system fault (for example, operating system failure), in which case the CPU may also set the fault flag.

At block 512, which may occur after block 508, the NTS arbiter may transmit a reporting command to a NIC of the managed server. The reporting command may include data read from the designated storage space of the storage module.

At block 516, which may occur after block 512, the NIC may transmit the report to the managing server over the network.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. This application is intended to cover any adaptations or variations of the embodiments discussed herein. Therefore, it is manifestly intended that embodiments in accordance with the present invention be limited only by the claims and the equivalents thereof.

What is claimed is:

1. An apparatus comprising:
   a central processing unit;
   a solid-state storage module configured to store information in a non-volatile manner;
   a storage controller coupled with the solid-state storage module, and configured to access the solid-state storage module;
   a network interface component (NIC) configured to communicatively couple the apparatus to a remote entity via a network;
   a first arbiter configured to communicatively couple the central processing unit to the storage controller bypassing the NIC, and to process block-level access requests from the central processing unit to access the solid state storage module through the storage controller; and
   a second arbiter configured to communicatively couple the NIC to the storage controller bypassing the central processing unit, and to process buffer-level access requests from the remote entity via the network and the NIC to access the solid state storage module through the storage controller, wherein the first and second arbiters are different arbiters;
   wherein the central processing unit, the solid-state storage module, the storage controller, the first arbiter, and the second arbiter are co-located with the NIC.

2. The apparatus of claim 1, further comprising:
   a controller hub configured to provide the block-level access requests to the first arbiter.

3. The apparatus of claim 2, further comprising:
a host storage access link, including the controller hub, the first arbiter, and the storage controller, configured to communicatively couple the central processing unit to the storage module; and
a network storage access link, including the second arbiter and the storage controller, configured to communicatively couple the NIC to the storage module by bypassing the central processing unit and a main memory of the apparatus.

4. The apparatus of claim 1, further comprising:
a controller hub including the NIC and the second arbiter.

5. The apparatus of claim 1, wherein the second arbiter comprises a processing unit and a memory.

6. The apparatus of claim 5, wherein the processing unit is configured:
to receive an access request identifying a buffer; and
to determine an address of a physical storage space that corresponds to the buffer based on a linked list in the memory; and
to issue another access request with the address of the physical storage space.

7. The apparatus of claim 1, wherein the solid-state storage module comprises a NAND flash device.

8. The apparatus of claim 1, wherein the solid-state storage module comprises a phase-change storage device.

9. A method comprising:
receiving, at a network interface component (NIC) of a server, a storage access request from a remote entity via a network, the storage access request identifying a posting buffer on the server;
routing the storage access request, by the NIC, to a storage controller of the server, via an arbiter of the server, directly coupled with, or integrated within, the NIC, to access a solid-state storage module of the server based on said storage access request, bypassing a central processing unit of the server; and
routing another storage access request of the central processing unit, identifying a block of the storage module, to the storage controller, via another arbiter of the server, bypassing the NIC, to access the solid-state storage module, wherein the two arbiters are different arbiters.

10. The method of claim 9, wherein said receiving a storage access request comprises:
receiving, from a remote boot server, a boot image to provision or repurpose the server and a command to store the boot image in the posting buffer.

11. The method of claim 9, wherein said routing comprises:
determining, by the arbiter, an address of a physical storage space that corresponds to the posting buffer; and
issuing, by the arbiter, another storage access request to the storage controller, with this another storage access request including the address of the physical storage space.

12. A method comprising:
receiving, at a network interface component of a server, a reporting command directly from a first arbiter of the server, the reporting command commanding a report to be transmitted to a remote entity via a network, wherein the reporting command includes data from an address space of a solid-state storage module of the server, wherein the first arbiter couples the network interface component to the solid-state storage module through a storage controller of the server to provide access to the solid-state storage module by the remote entity bypassing a central processing unit of the server, wherein the first arbiter is different from a second arbiter of the server that couples the central processing unit of the server to the solid-state storage module through the storage controller bypassing the network interface component; and
transmitting, by the network interface component, the report including the data to the remote entity over the network.

13. The method of claim 12, wherein the method further comprises:
detecting, by the first arbiter, a fault event of the server; and
generating the reporting command based on said detecting.

14. The method of claim 13, wherein said detecting comprises:
receiving a fault indicator from the remote entity.

15. The method of claim 13, wherein said detecting comprises:
determining a fault flag is set in the solid-state storage module.

16. A method comprising:
transmitting, by a boot server to a first arbiter on a target server coupled to the boot server via a network, through a network interface component of the target server, an allocation request;
receiving, by the boot server from the first arbiter, through the network interface component and the network, a response indicating an identifier of a posting buffer of the target server allocated to the boot server based on the allocation request; and
transmitting, by the boot server to the first arbiter, through the network and the network interface component, the identifier and a boot image to store in a storage space of a solid-state storage module of the target server that corresponds to the posting buffer;
wherein the first arbiter couples the network interface component to the sold-state storage module through a storage controller of the target server, bypassing a central processing unit of the target server, and wherein the first arbiter differs from a second arbiter of the target server that couples the central processing unit to the sold-state storage module, bypassing the network interface component, through the storage controller.

17. The method of claim 16, further comprising:
provisioning, by the boot server, a plurality of servers including the target server by transmitting the boot image over a network.

18. The method of claim 16, further comprising:
receiving, by the boot server, from the network interface component of the target server, a media access control (MAC) address;
determining, by the boot server, the target server is a provisionable server based on the MAC address; and
transmitting, by the boot server, the allocation request based on a result of said determining.

19. The method of claim 16, further comprising:
providing, by the boot server, a requested size of the posting buffer within the allocation request.

* * * * *